Dec. 25. 1923.

Re. 15,737

M. E. NEENAN

SHEAVE

Original Filed Aug. 17, 1921

INVENTOR

M. E. Neenan

BY

Rogers, Kennedy & Campbell

ATTORNEY

Reissued Dec. 25, 1923. Re. 15,737

UNITED STATES PATENT OFFICE.

MICHAEL E. NEENAN, OF NEW YORK, N. Y., ASSIGNOR TO NEENAN ELEVATOR CORPORATION, A CORPORATION OF NEW YORK.

SHEAVE.

Original No. 1,442,899, dated January 23, 1923, Serial No. 492,896, filed August 17, 1921. Application for reissue filed May 28, 1923. Serial No. 642,125.

*To all whom it may concern:*

Be it known that I, MICHAEL E. NEENAN, a citizen of the United States, and a resident of the city of New York, in the county of New York and State of New York, have invented certain new and useful Improvements in Sheaves, of which the following is a specification.

The invention relates to improvements in sheaves applicable to elevator utilities, having associated therewith a radially disposed fiber peripheral traction tread arranged to receive ropes and cables of any material which latter forms their own grooves on frictional engaging surfaces.

One object of the invention is the providing of a peripheral traction tread for sheaves or like articles of manufacture, made up of a plurality of twisted tarred fiber portions or other like material radially disposed with relation to the axis of the sheave, and permanently pressed into position upon the reception drum of said sheave by means of a locking or clamping plate in order to insure an increased traction gripping and wear resisting surface.

Another object of the invention resides in the fact, that by providing a traction tread of the type as set forth, that cables and other like units of sustenance, wear or cut their own grooves or channels therein, and by reason of the difference in material, retard wear and injury to the engaging faces of the units, and further a traction tread that when worn out, and requiring readjustment, such parts may be discarded and an entire new tread supplied at very little cost and trouble.

In the following is described in connection with the accompanying drawings, one embodiment of the invention, the features thereof being more practically pointed out hereinafter in the claims.

Figure 1:
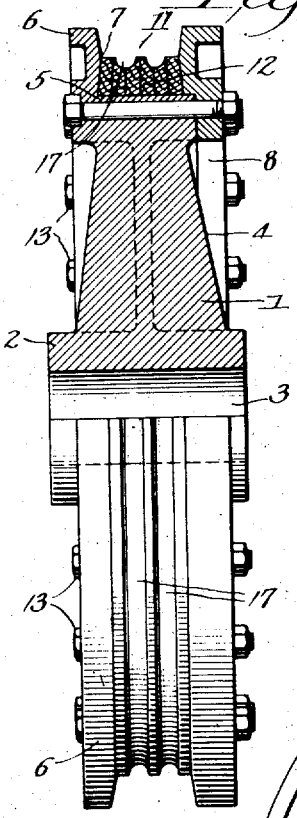
Figure 3:
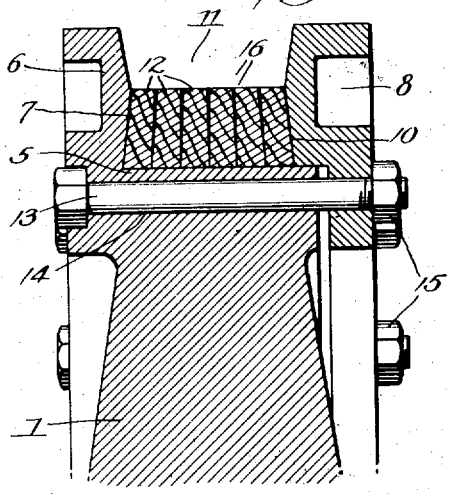
Figure 2:
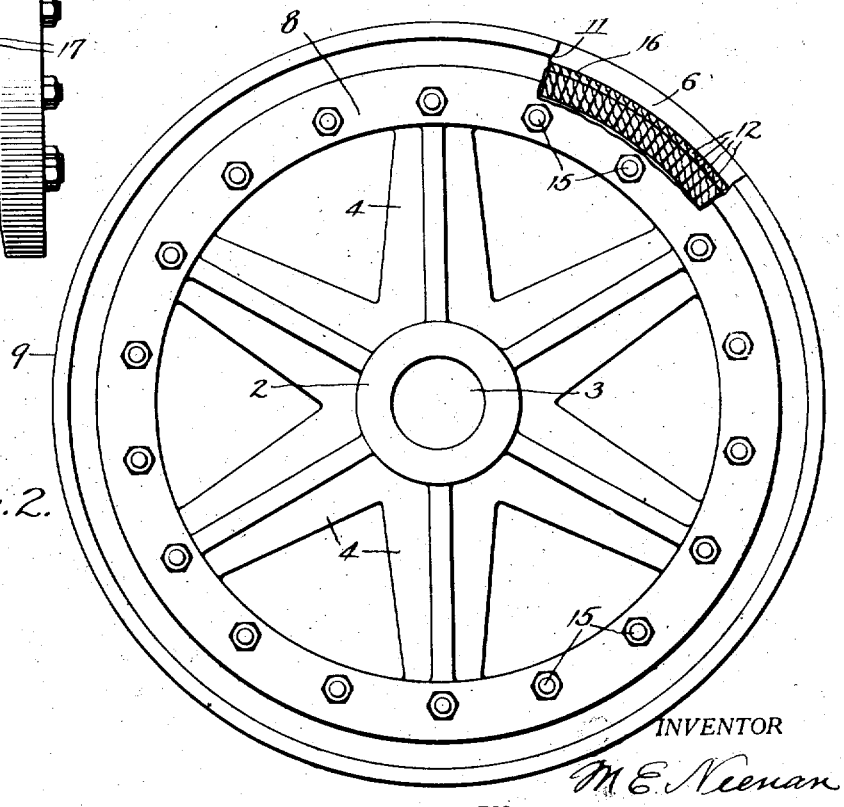

In the drawings, Fig. 1 is an end view of a sheave part thereof being shown in vertical sectional view illustrating the invention after the grooves have been cut therein by reason of the engagement therewith of cables, ropes, etc.; Fig. 2 is a detail vertical sectional view of the sheave and fiber frictional tread illustrating the disposition of the units of material comprised in said tread and Fig. 3 is an elevation of a sheave part of its edge being broken away to show the peripheral tread of fibrous material applied thereto.

Similar numerals of reference indicate similar parts throughout the several views.

In the drawings 1 designates the body of a sheave comprising a sleeve core 2 having formed therein an aperture 3 arranged to receive a shaft and a series of spokes 4 carrying at their outer ends a female drum 5 provided at its edge with a channeled shoulder 6. The inner wall of shoulder 6 is tapered inwardly at 7 to form a reception housing for the peripheral fiber tread.

8 indicates a locking plate provided with a channeled shoulder 9 and a tapering wall 10 to form the outer side of the sheave channel 11.

12 designates a multiplicity of fiber rope ends, set on their respective ends on the housing formed by the female drum 5 and the tapered inner walls 7 and 10 of the cable housing or channel 11, and when said fiber ends are properly disposed thereon, a series of bolts 13 are inserted in holes 14 and nuts 15 placed thereon, and the plate 8 is forced inwardly to a proper tension, the compression created by seating said locking plate 8 causes the fibrous fillers to become a compact hardened tractional tread, with a flush wear resisting surface 16. Said surface 16 within channel 11 is depressed between the respective shoulders of the sheave, thereby providing guides for the units in operative connection therewith. The action on said tread by cables, ropes or sheave actuating units, form in said peripheral tread grooves 17 in which said units run until the fibrous filler is worn out or destroyed, at which time an entire new tread may be inserted with a minimum of time and expense.

The twisted tarred fiber rope ends disposed on the body of the sheave as above described, constitute in effect a tread portion for the sheave, composed solely of a mass of separate individual fibers extending lengthwise of each other side by side, which tread portion presents a flush, wear resistant, tractive surface composed solely of the outer ends of the fibers. The tar of the rope ends forms a viscous binder which permeates the mass of fibers, so that when the fiber mass is clamped between the shoulder and the locking plate of the reception housing, it will become compacted into a hardened tractional tread body of such character that the cables or ropes in their action on the flush wear resistant surface, will form the peripheral tread grooves 17 before alluded to, whereby the ropes or cables will be gripped by the walls of the grooves with a maximum tractive effect.

The invention may be varied in many ways, and diverse materials may be used, without departing from the general spirit of the invention.

What is claimed and desired to secure by Letters Patent of the United States is:

1. A device of the character described comprising a sheave supporting body, a reception drum formed thereon, a series of twisted tarred rope ends set radially to the axis of said drum adapted to form a peripheral traction tread therefor, and a locking plate mounted on said drum and engaging said traction tread arranged to hold said tread in position thereon.

2. A device of the character described including a peripheral traction tread for sheaves, comprising a plurality of twisted tarred rope ends disposed radially with relation to the axis of said sheave, a reception drum formed on said sheave adapted to receive said tread, and a locking plate mounted on said drum and engaging said tread adapted to compress said tread into substantially a solid fibrous mass into which a plurality of cables may form a plurality of grooves.

3. A sheave provided with a tread portion composed solely of separate individual fibers extending lengthwise of each other side by side substantially radially of the sheave and confined on the periphery of the sheave as a unitary body, and presenting a flush, wear resistant, tractive surface, composed solely of the outer ends of the fibers.

4. A sheave provided with a tread portion composed solely of a mass of separate individual fibers extending lengthwise of each other side by side radially of the sheave, the said mass of fibers being confined on the sheave as a unitary body, and presenting a flush, wear resistant, tractive surface, composed solely of the outer ends of the fibers.

5. A sheave consisting of a body portion having a peripheral supporting surface and provided with a tread portion composed solely of a mass of individual separate fibers extending lengthwise of each other side by side radially of the sheave with their inner ends seated on said supporting surface, and their outer ends presenting a flush, wear resistant, tractive surface composed solely of the outer ends of the fibers.

6. A sheave provided with a tread portion composed solely of an aggregation of separate individual fibers extending lengthwise of each other side by side radially of the sheave and compacted into a hardened mass presenting a flush, wear resistant, tractive surface composed solely of the outer ends of the fibers.

7. A sheave provided with a tread portion composed of a mass of separate individual fibers and a permeating viscous binder, the said fibers extending lengthwise of each other side by side radially of the sheave and confined fixedly on the periphery of the sheave as a unitary body, and presenting a flush, wear resistant, tractive surface, composed solely of the outer ends of the fibers.

8. A sheave provided with a peripheral tractive portion composed of a mass of fibers made up of a series of bundles of individual fibers extending substantially radially of the sheave, with their outer ends presenting a tractive surface.

MICHAEL E. NEENAN.